Dec. 29, 1925.
F. A. WEEKS
LANTERN SLIDE
Filed April 6, 1921
1,567,310
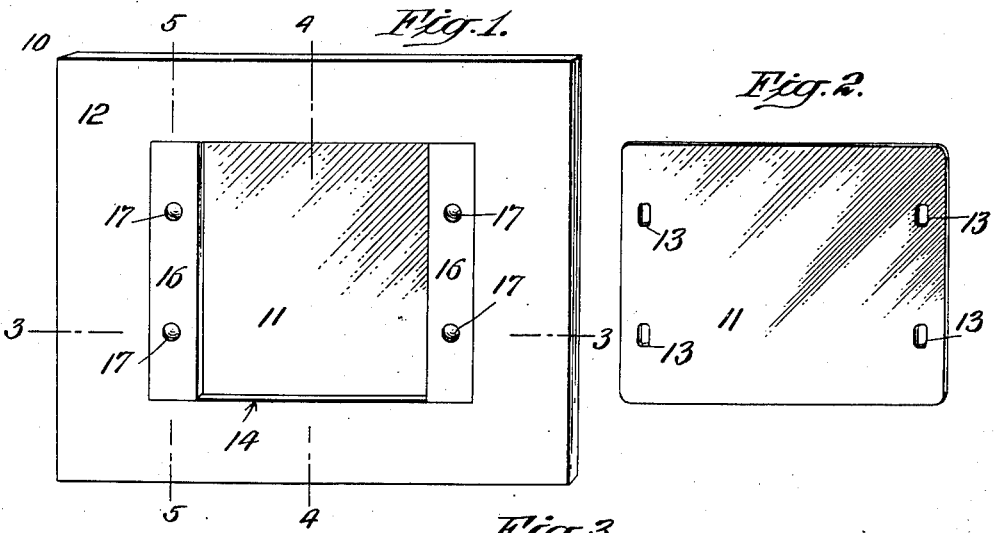
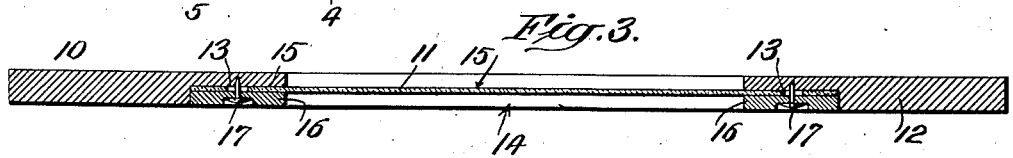
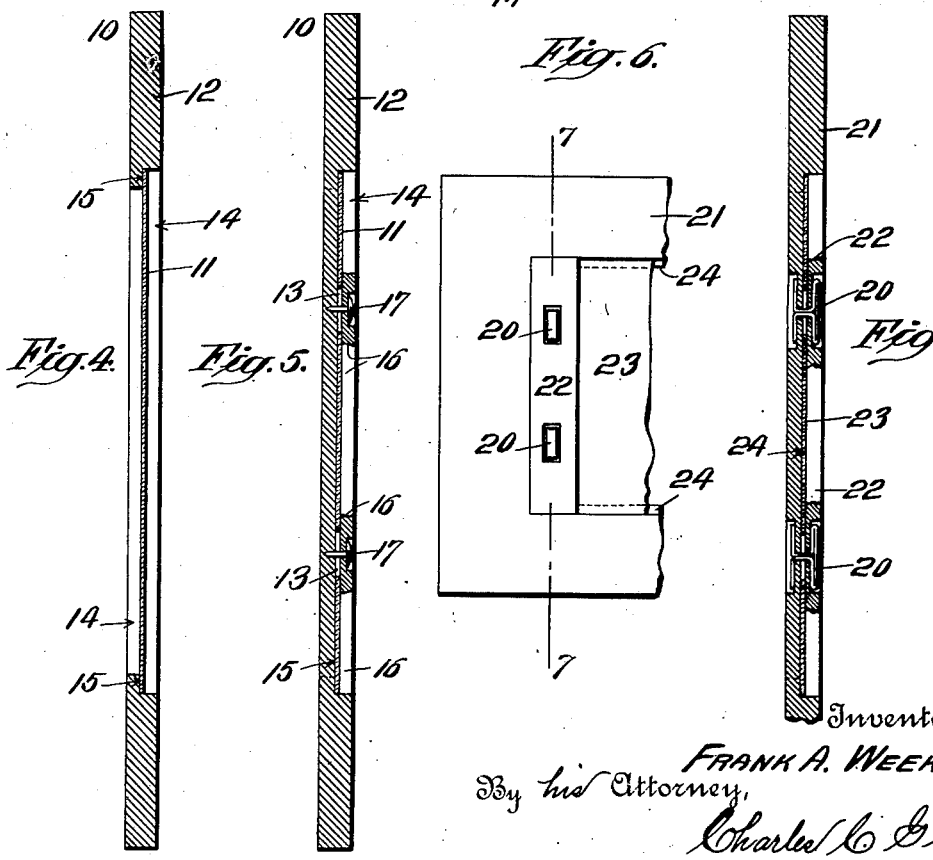
Inventor:
FRANK A. WEEKS
By his Attorney,
Charles C. Gill.

Patented Dec. 29, 1925.

1,567,310

UNITED STATES PATENT OFFICE.

FRANK A. WEEKS, OF PLAINFIELD, NEW JERSEY.

LANTERN SLIDE.

Application filed April 6, 1921. Serial No. 459,075.

*To all whom it may concern:*

Be it known that I, FRANK A. WEEKS, a citizen of the United States, and a resident of Plainfield, in the county of Union and State of New Jersey, have invented certain new and useful Improvements in Lantern Slides, of which the following is a specification.

The invention provides a lantern slide to replace the usual glass plates or slides which have been commonly used for many years in connection with projecting machines or apparatus for showing pictures on screens or curtains. The glass plates to which I refer bear the picture which is to be displayed on a screen and said plates are usually about four inches long, three and one-quarter inches wide and one-eighth of an inch in thickness. These glass plates are frequently employed by lecturers and a great many of the plates may be used in one lecture as illustrative of one subject. These plates are too well known to require extended description, but I desire to call attention to some of their inconveniences which my invention remedies. In the first place the plates are fragile and hence damage and great inconvenience frequently result from the accidental breakage of the plates, one such inconvenience arising should some of a set of the plates illustrative of the points of a lecture be broken in transit to the lecture-hall. The plates are also frequently broken by being dropped on the floor during the handling of the same for display purposes. The glass plates are also heavy, especially when a collection of them are together, and the plates involve undue expense, labor and care in many ways.

My invention provides a substitute for the aforesaid glass plates, and the lantern slide of my invention comprises a special light weight frame or holder of non-frangible material and a thin, flexible, transparent film bearing the picture and secured within said frame or holder, said frame carrying the thin card-like picture-film preferably having the same proportions as the glass plates so as to be used as a substitute therefor in the present projecting machines employed to receive the glass plates. The slides of my invention are light in weight and non-frangible and the thin films may be detachably secured within the holding-frames, thus permitting a change of films whenever desired. The advantages of being able to use the thin flexible films as a substitute for the glass plates are manifold, and my invention makes it entirely convenient to employ the thin films for lantern slides and to dispense entirely with the glass plates.

The invention will be fully understood from the detailed description hereinafter presented, reference being had to the accompanying drawings, in which:

Fig. 1 is a perspective view of a lantern slide constructed in accordance with and embodying my invention;

Fig. 2 is a like view of the picture-carrying thin flexible transparent film or plate detached from the holder therefor shown in Fig. 1;

Fig. 3 is a horizontal section, on an enlarged scale, through the lantern slide, taken on the dotted line 3—3 of Fig. 1;

Fig. 4 is a vertical section through the same taken on the dotted line 4—4 of Fig. 1;

Fig. 5 is a like section, with the cleat 16 partly broken away, through the same taken on the dotted line 5—5 of Fig. 1;

Fig. 6 is an elevation, partly broken away, of the lantern slide of my invention equipped with a modified form of means for securing the film within the holder therefor, and Fig. 7 is a vertical section, on an enlarged scale and partly broken away, of the same taken on the dotted line 7—7 of Fig. 6.

In the drawings, referring to Figs. 1 to 5 inclusive, 10 designates the lantern slide as a whole, 11 the picture-carrying thin flexible transparent film and 12 the frame or holder for said film.

The film 11 will bear the picture or work to be projected on a screen, and this film is of pyroxyline character, being non-inflammable, thin, transparent and flexible and of the general nature employed in the production of the long moving picture films. The film 11 is of oblong or card outline, being slightly greater in length than in width, and at each of its ends said film is formed with two holes or apertures 13.

The frame or holder 12 is also of oblong outline and has an opening or window 14 which when the film 11 is in the frame is closed thereby. The opening 14 is formed, about midway of the thickness of the frame 12, with a shoulder or seat 15 for the film 11, said seat being extended entirely around said opening as an oblong counter-sunk seat or shoulder and being wider at its end portions, shown in Fig. 3, than at its upper and lower or longitudinal portions whose width is illustrated in Fig. 4. The frame 12 receives on the seat 15 the edge portions of the film 11, as shown in Figs. 3 and 4, and said film is secured on said seat and at the same time held flat by means of cleats 16 and pins 17, these cleats 16 being thin strips fitting into the end portions of the opening 14 and pressing the film against the seat 15. The cleats 16 preferably tightly wedge at their upper and lower ends against the upper and lower walls of the opening 14 at the outer edges of the seat 15 and may further be secured in place by the pins 17 which are pressed through said cleats and the holes 13 in the film and into the frame 12 at the broader or end portions of the seat 15, as shown in Figs. 3 and 5, the heads of said pins being countersunk in the cleats 16, and the outer surface of said cleats being flush with the adjacent surfaces of the frame 12. I call attention to the fact that while the pins 17 pass through the holes 13 they do not form said holes and are not allowed to puncture the film but lie within the holes and entirely clear of the edges thereof. The holes 13 are formed in the material of the film as an original step in the manufacture of the film and while said material is soft, the holes having finished edges of the same character as the edges of the body of the film.

The holder or frame 12, except as to the cleats 16, will be in one integral piece of light-weight, non-frangible, reasonably hard, stiff material, as pressed pulp, indurated fibre or the like or of other material convenient for carrying out the purposes of my invention, an essential consideration being that said material shall be of rigid character or stiff, as exemplified by pressed pulp or indurated fibre, so as not only to resist wear or disfigurement and protect the film against being carelessly or otherwise bent or folded but to permit the slides to be passed through the projecting apparatus in the same manner that glass slides are made use of. The cleats 16 will preferably be formed of the same material as the general frame 12. With the use of the cleats 16 and seat 15 the film 11 may be very conveniently secured within the frame 12, and said frame and film being very light in weight, the lantern slides provided by my invention may be very readily handled either singly or in bulk. The fact that the slides are light in weight and non-frangible is of very great advantage when the slides are to be carried about, as for lecture purposes, or to be shipped, as will be obvious.

Figs. 6 and 7 show a modification of the lantern slide more particularly with reference to employing ordinary types of paper fasteners 20 as means for securing the cleats and film within the frame or holder. The construction shown in Figs. 6 and 7 being a modification, I number the main frame or holder 21, the cleats 22, the film 23 and the seat for the film 24, and said construction will be understood without further detailed explanation, being in all essential respects the same as the construction shown in Figs. 1 to 5 inclusive.

In both forms of my invention hereinbefore described, the glass plates or glass lantern slides and their undue expense, care and inconvenience are wholly dispensed with and the use of thin flexible films held in frames of the exact dimensions of the glass plates is rendered entirely practicable and convenient.

In both forms of my invention the surfaces of the picture-carrying film are protected against abrasive action, said film being set inwardlly from both faces of the holding-frame, and in both forms of my invention both faces of the frame are flush or flat or lacking in projections, whereby the frame may be conveniently used in projecting machines the same as the glass plates have heretofore been made use of.

What I claim as my invention and desire to secure by Letters-Patent, is:

1. A lantern slide of the character hereinbefore described, comprising a thin flexible transparent picture-carrying film and a hard stiff non-frangible open frame holding and protecting said film, said frame having at its film-opening an inset seat for the film and said film having spaced apart initially formed openings in pairs in its opposite edges over said seat, cleats pressing the apertured end portions of the film against said seat and being flush with the adjacent outer surface of said frame and fasteners extending through said cleats and said openings and entering the body of the frame and securing said cleats and film rigidly in position, said fasteners in their portions which enter said openings being substantinally less in diameter than the openings.

2. A lantern slide of the character hereinbefore described, comprising a thin flexible transparent picture-carrying film and a hard stiff non-frangible open frame whose body is in one rigid piece holding and protecting said film, said frame having formed in the body thereof at its film opening an inset seat for the film and said film having spaced apart initially formed openings in pairs in its opposite edges over said seat, cleats pressing the apertured end portions of the film against said seat and being flush with the adjacent surface of said frame and fasteners extending through said cleats and said openings and engaging the body of the frame for securing said cleats and film firmly in position, said fasteners lying within and being free of the edges of said openings and at their heads being counter-sunk within said cleats.

Signed at New York city, in the county of New York and State of New York, this 4th day of April A. D. 1921.

FRANK A. WEEKS.